United States Patent
Smith et al.

(10) Patent No.: US 7,210,169 B2
(45) Date of Patent: Apr. 24, 2007

(54) ORIGINATOR AUTHENTICATION USING PLATFORM ATTESTATION

(75) Inventors: Ned McArthur Smith, Beaverton, OR (US); Selim Aissi, Beaverton, OR (US); Willard M. Wiseman, Vernonia, OR (US)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 10/225,048

(22) Filed: Aug. 20, 2002

(65) Prior Publication Data
US 2004/0039946 A1   Feb. 26, 2004

(51) Int. Cl.
G06F 7/04   (2006.01)
(52) U.S. Cl. .................... 726/28; 726/27; 709/228
(58) Field of Classification Search .............. 726/20, 726/9; 713/156
See application file for complete search history.

(56) References Cited

U.S. PATENT DOCUMENTS

| | | | | |
|---|---|---|---|---|
| 5,943,423 A | * | 8/1999 | Muftic | 705/67 |
| 6,715,073 B1 | * | 3/2004 | An et al. | 713/156 |
| 2001/0037379 A1 | * | 11/2001 | Livnat | 709/219 |
| 2002/0194496 A1 | * | 12/2002 | Griffin et al. | 713/200 |

* cited by examiner

Primary Examiner—Kambiz Zand
Assistant Examiner—Roderick Tolentino
(74) Attorney, Agent, or Firm—Marger Johnson & McCollom, P.C.

(57) ABSTRACT

An originator device allows for a unique passphrase to be communicated to a service system. The originator device has a fixed token in which a unique platform identifier is recorded and a processor to generate a representation of the platform configuration. This representation is communicated to the registry service as a unique, platform-specific passphrase associated with the originator.

13 Claims, 6 Drawing Sheets

ORIGINATOR AUTHENTICATION USING PLATFORM ATTESTATION

BACKGROUND

Most services require user identification. The method for proving the identity is authentication. The typical ways to provide authentication include but are not limited to authentication protocols and transmitted stored or user entered passphrase. This result of the authentication protocol or transmission of a passphrase serves as a credential proving identity. Examples of services that use these authentication methods are: LDAP, HTML documents, UDDI, etc.

For example, the Universal Description, Discovery and Integration (UDDI) architecture provides a service with which businesses can register and then utilize to publish their information as well as seek information about other businesses. LDAP stands for the Lightweight Directory Access Protocol that specifies how global directories should be structured. Directories using LDAP typically require the user to enter a user id and passphrase.

A possible pitfall for clients using these services is their vulnerability to attacks by hackers and impostors. Impostors could insert themselves into the process and usurp information, possibly sensitive, from both the client and the service. This could lead to such problems as theft of monies involved in transactions, identity theft and others.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
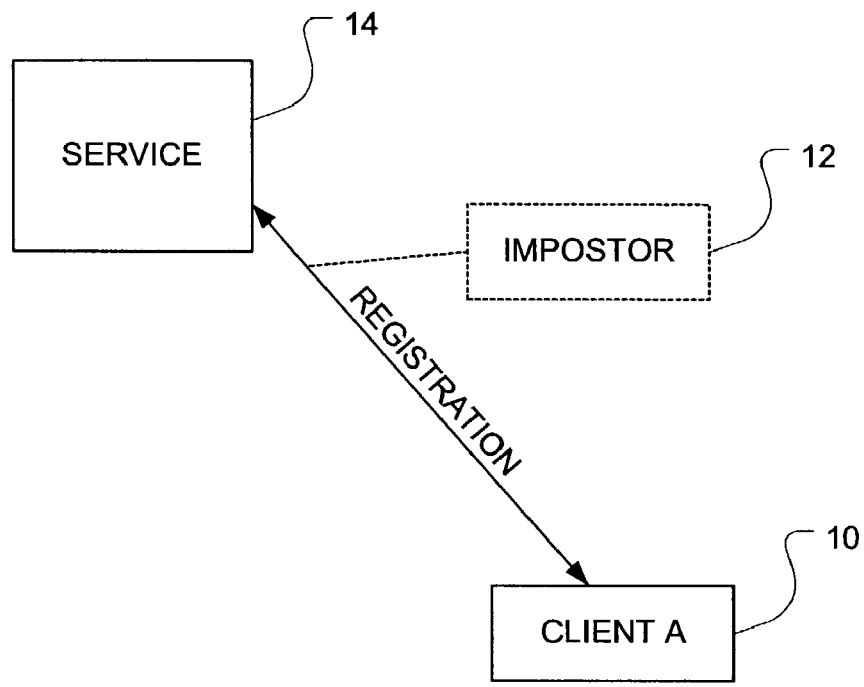
FIG. 1 shows an embodiment of an registration interaction in accordance with the prior art.

A typical interaction between a user/client and a service is shown in FIG. 1. The client A 10 registers with the service 14. The service may be one of several types of services, including UDDI, LDAP, etc. An impostor 12 could intercept the information transmitted between the service 14 and the client 10. This information could then be used to the impostor's advantage and the client's disadvantage, or the impostor could even enter the impostor's information into the service, taking the client's place.

Figure 2:
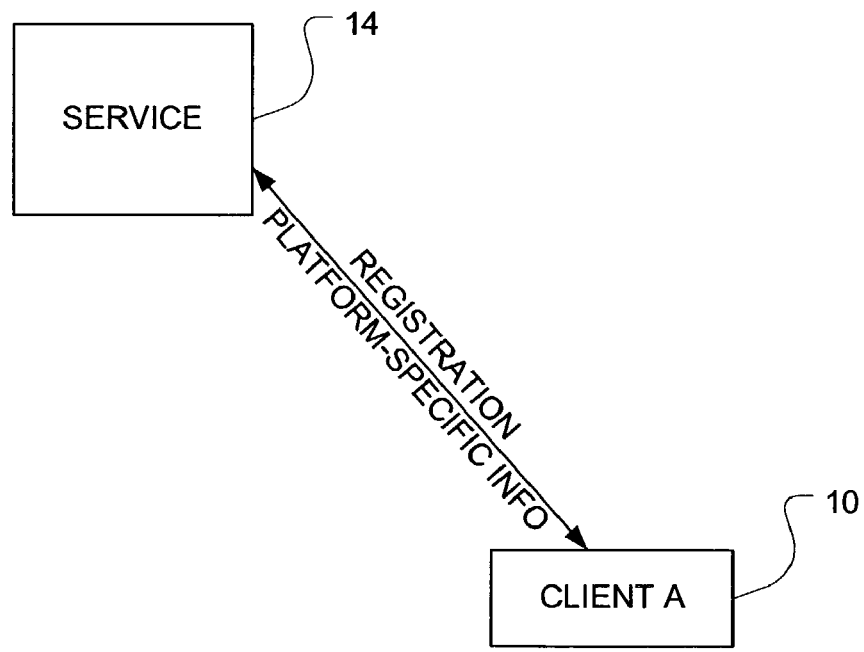
FIG. 2 shows an embodiment of an registration interaction such as UDDI in accordance with embodiments of the present invention.

In FIG. 2, however, the same process occurs, except that client A supplies some platform specific information with the user id and passphrase. For example, the client's platform has a unique platform identifier, typically part of the fixed token, as will be discussed in more detail with regards to FIG. 3. The fixed token is permanently affixed to the motherboard and has a 1:1 relationship with the platform. There are keys associated with the fixed token. Typically, keys are RSA keys, or Attestation Identity Keys (AIK). However, here is a 1:1 relationship between the keys and the platform, so these will be referred to as unique platform identifiers.

Because the unique platform identifier is supplied as part of the passphrase, only the user on that platform can access the service. This effectively prevents the impostors from being able to insert themselves into the interactions between the service 14 and the client 10.

Figure 3:
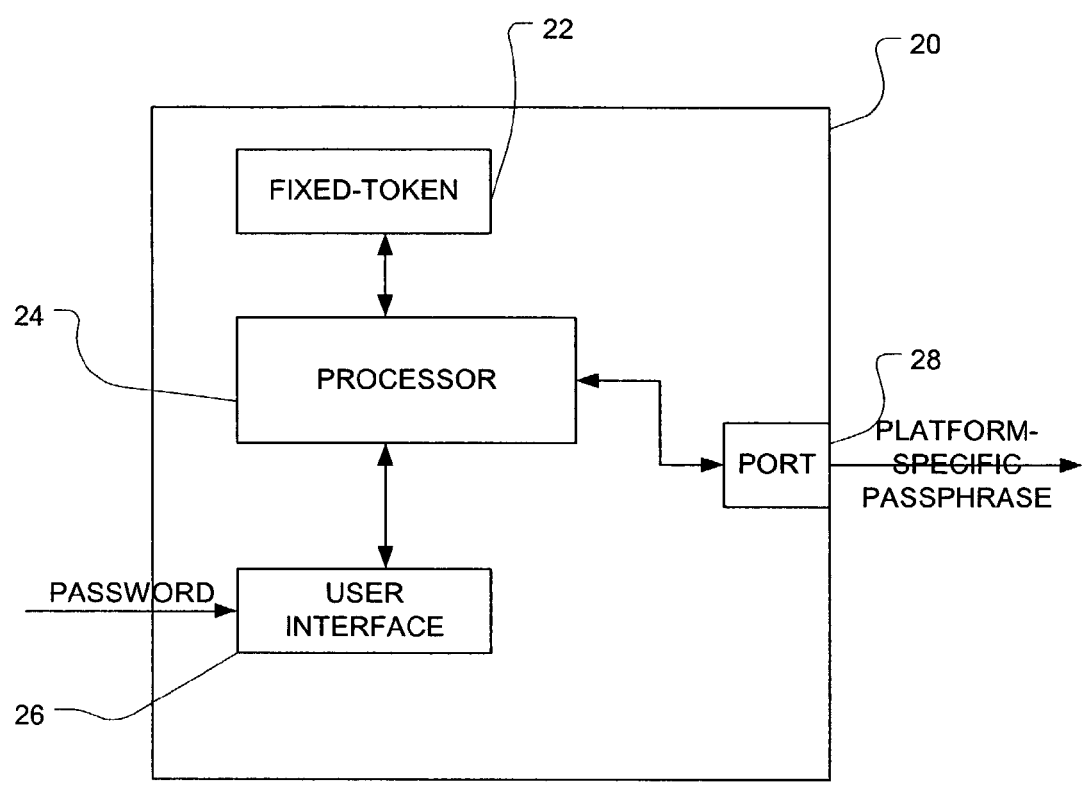
FIG. 3 shows an embodiment of a platform device.

An embodiment of a platform with a fixed-token capability as well as the capability to provide this unique passphrase is shown in FIG. 3. The platform 20 includes a processor 24, a fixed-token 22, a user interface 26 and communications port 28. The processor 24 could be any type of component that is capable of performing hash operations on data, including a general-purpose processor, a digital signal processor (DSP), a microcontroller, an application specific integrated circuit (ASIC), or a field-programmable gate array (FPGA). Similarly, the fixed token 22 may be an integrated circuit or chip, or even part of another component, including the processor. As mentioned above, the fixed token is permanently affixed to the motherboard and has a 1:1 relationship with the platform.

Typically, AIKs are used to digitally sign the platform's configuration registers. For example, during a service interaction, the passphrase would be generated as a hash, also referred to as a representation, of the signed fixed-token platform configuration. The representation will more than likely be a hash of an attribute of the fixed token, such as unique keying information associated with the fixed token. Whenever the subscriber desires to interact with the service the authentication token originally sent from the service to the subscriber will include this information, making it non-guessable and platform specific. The passphrase hash may include data received from the originator as a password on user interface 26. The passphrase is communicated to the service through the communication port 28. The port 28 may be a communications port for a remote service such as an Ethernet port or modem port, or it may be simply a direct line to another component of the system for local communication.

Figure 4:
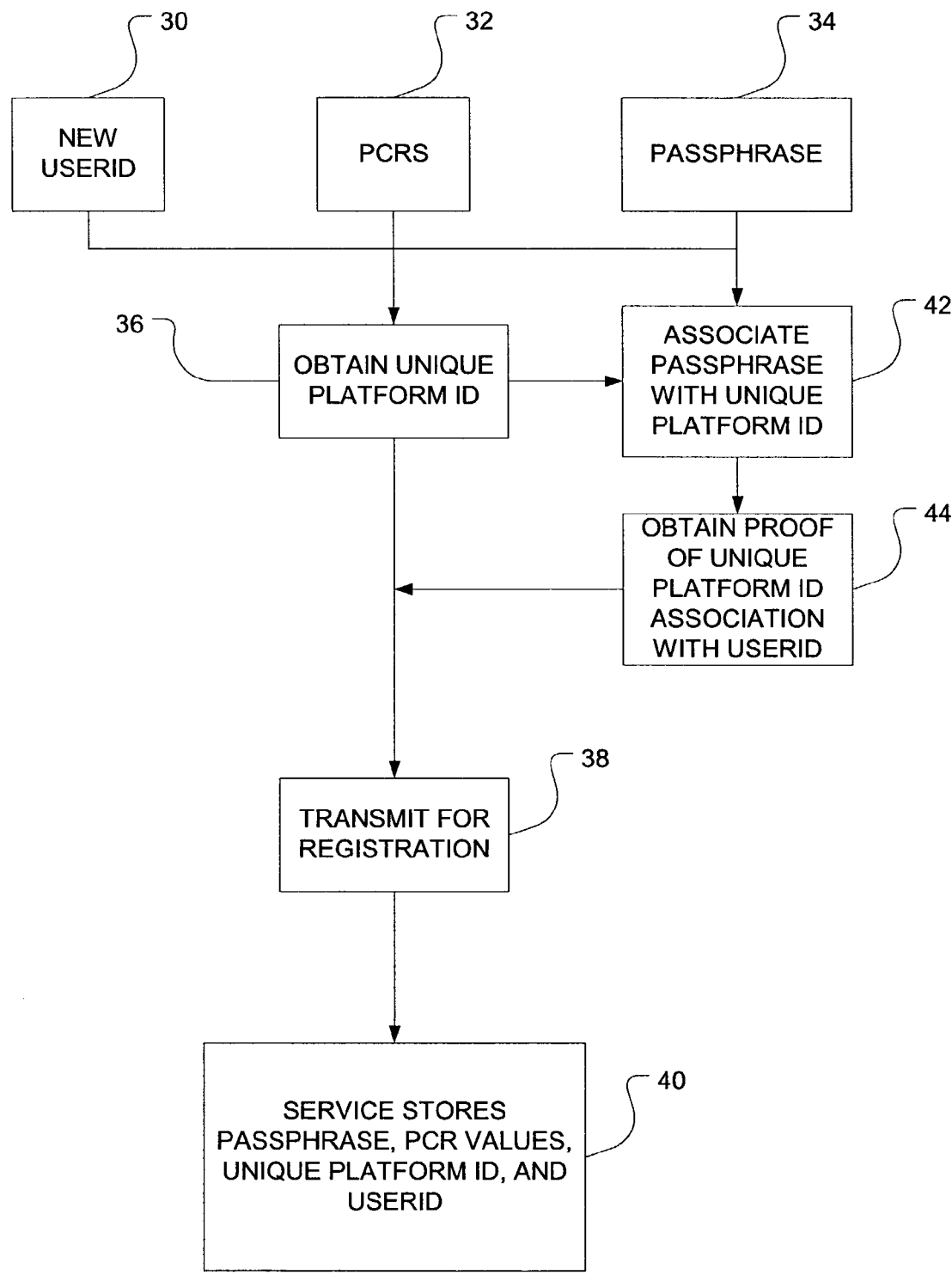
FIG. 4 shows a flowchart of an embodiment of a method of registering with a service.

The interactions with the service have two aspects. The first interaction is the initial registration with the service and the second is when the client desires to use the service. FIG. 4 shows a flowchart of an embodiment and options for the registration process with a service using a platform specific passphrase.

In a first embodiment, the client desiring registration with the service transmits a new user id at 30, a passphrase at 32 and the platform configuration register (PCR) values for the platform at 34. Typically, the platform configuration registers (PCRs) are populated upon platform initialization, such as power-up or re-boot. In one embodiment, the PCRs are populated by the system taking measurements to create data values that are then hashed. For example, an initial measurement may be a 64 Kbit measurement that is hashed to a 160-bit value. This 160 bit value is then extended to a PCR register by taking the current PCR register value, another 160 bit value, and concatenating them together. This 320-bit value is then hashed to a 160-bit value and the value is stored in the PCR. The service may have a specified number of PCR values that it requests from the client platform, or the client platform may specify. The implementation of the reading of the PCRs is left to the system designer.

In this embodiment, the unique platform identifier, such as the AIK or RSA key, is obtained at 36, and all of these values are transmitted for registration at 38. Note that transmission may involve a user voluntarily transmitting the value, or the service requesting the values, possibly without the user's knowledge. At 40, the service stores the passphrase, the PCR values, the unique platform ID and the user ID. In one embodiment the passphrase, PCR values and the platform ID may be bound to the user ID to allow for easier and faster access for subsequent interactions.

In another embodiment, the service receives or retrieves the unique platform ID and the user passphrase and associates them at 42. At 44, proof is then obtained that the association of the platform ID and the user ID associated with that passphrase is valid. This may be obtained in several ways but typically during the registration process while in or using some trusted environment. For example, the user could, using a telephone, convey validation information to a person involved in the registration. In this case the telephone is a trusted process in that it would be difficult to attack both the telephone system and the network simultaneously. Note that the use of a telephone is just intended as an example of a proving mechanism and is not intended to limit the scope of the claims. This will be discussed in more detail with regard to the interaction described with reference to FIG. 7.

Figure 5:
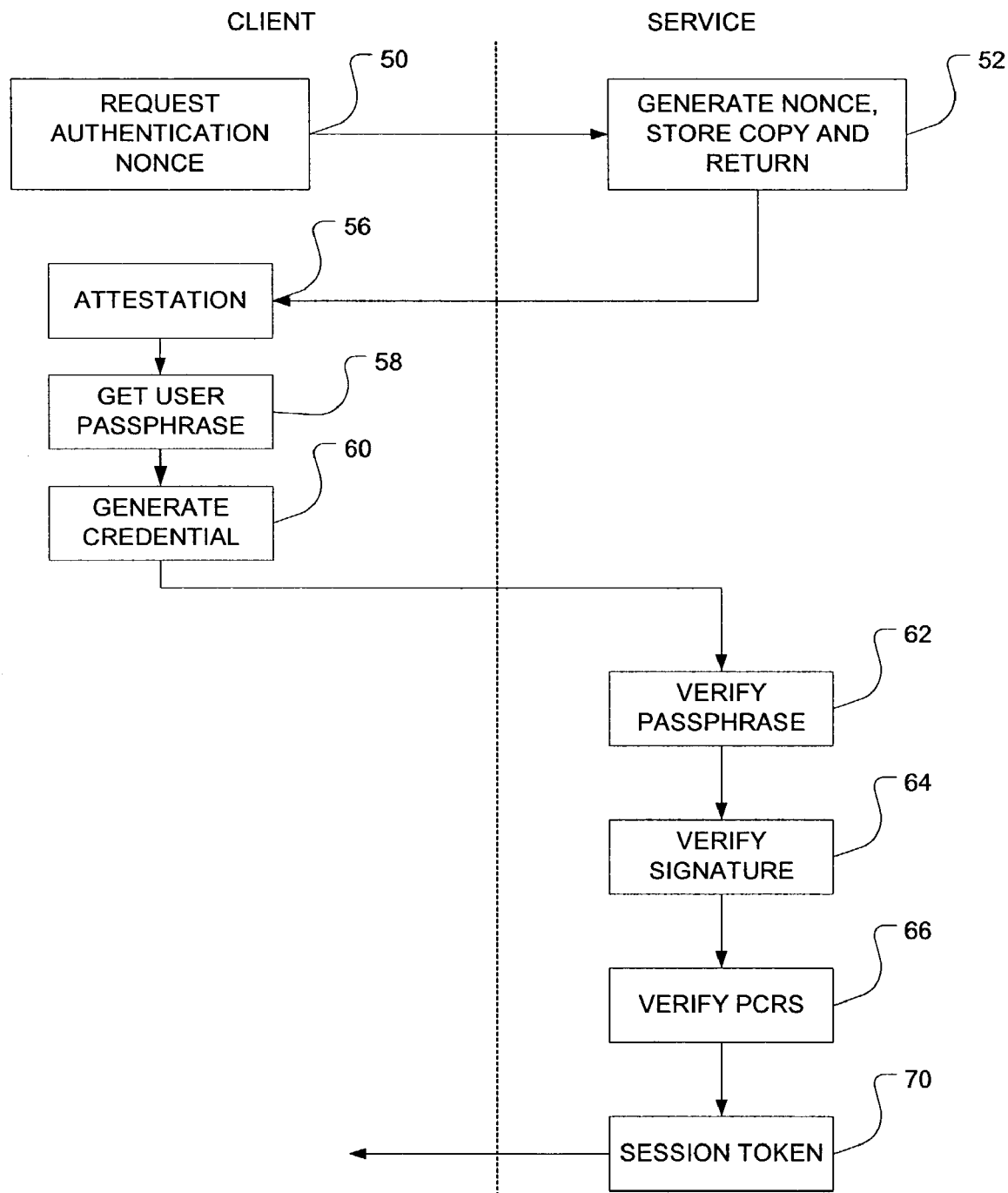
FIG. 5 shows a flowchart of an embodiment of a method of accessing a service by a client that has previously registered with the service.
Figure 6:
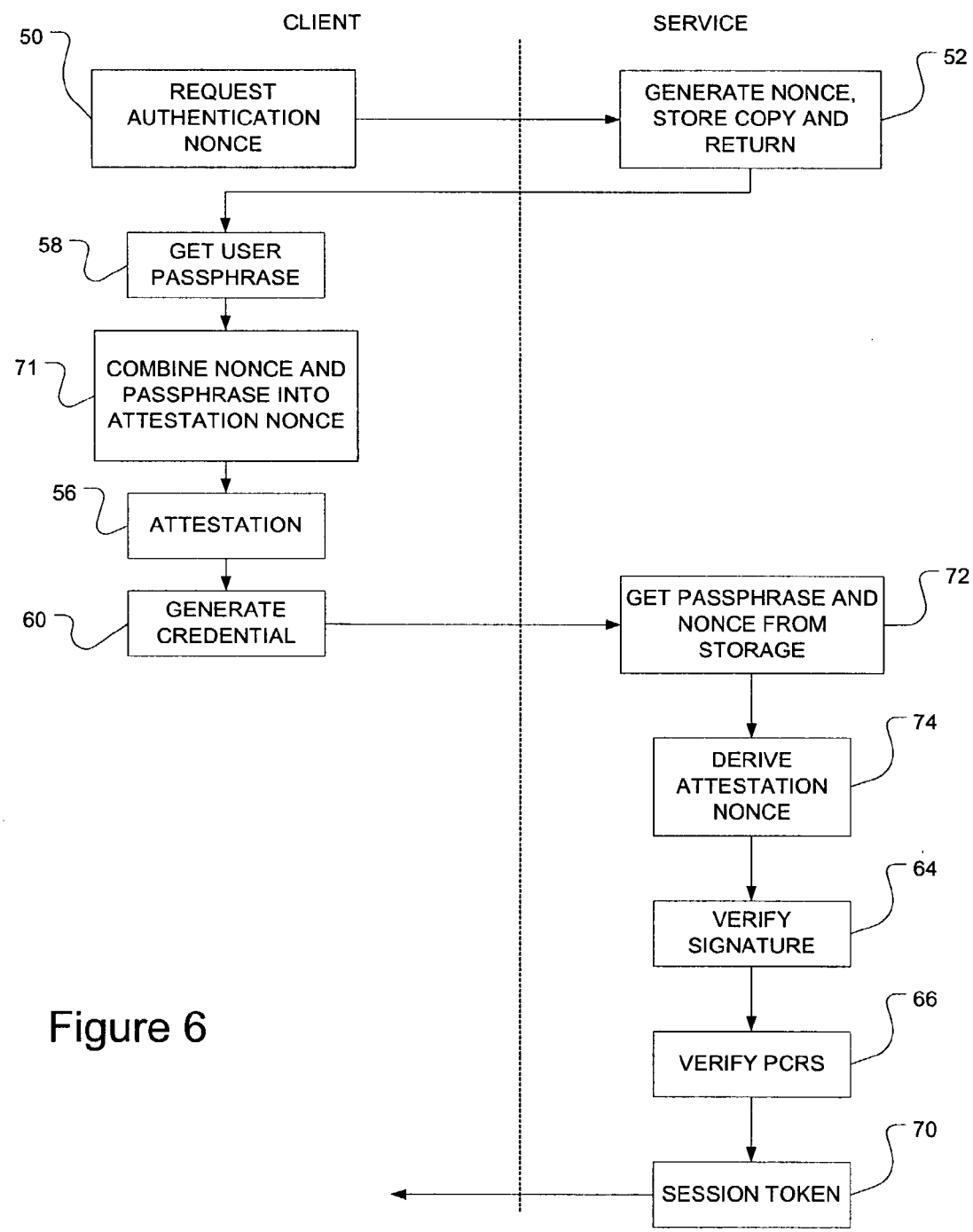
FIG. 6 shows a flowchart of an alternative embodiment of a method of accessing a service by a client that has previously registered with the service.

FIGS. 5 and 6 show flowcharts of alternative embodiments of interacting with the service, based upon a registration process similar to that discussed in the first embodiment above. In FIG. 5, the process begins by the user starting the login process with the service. The user requests an authentication nonce from the service at 50. A nonce, as the term is used here, is an element intended for one-time use, such as a random number, a time stamp, or a counter, that is used in mathematical operations such as digital signature functions. At 52, the service generates the nonce, stores a copy of it and returns the nonce to the user. At 56, the client platform performs attestation, in which the platform is identified by a digitally signed reading of the PCR values. The unique platform ID is typically used to perform the digital signature.

At 58, the client acquires the user passphrase from the user and combines it with the attestation at 60. The service then verifies the passphrase at 62, the signature at 64 and the PCR values at 66. If all of those verify correctly, the service provides the user with a session token at 70 and the user interacts with the service.

FIG. 6 shows an alternative embodiment of an interaction based upon the first embodiment of registration discussed above. Similar to FIG. 5, the user requests an authentication nonce at 50, which the service generates, stores a copy and returns at 52. The client then gets the user passphrase at 58, combining the nonce and the passphrase into an attestation nonce at 71. This will typically be done by a hashing function, resulting in an attestation nonce, which is used in 56. This is similar to the attestation performed in the previous embodiment at 56, but the attestation provided will differ from the previous attestation.

At 60, the client sends the credential to the service. The service obtains the nonce and passphrase from storage at 72 and then uses them to derive the attestation nonce provided at 56 in 74. This is then verified by verifying the signature at 64 and the PCRs at 66. If the derived attestation nonce does not match the transmitted attestation nonce, or if either of the signature or the PCR values are different, the process will failure. If they are all valid, the session token is provided at 70.

Figure 7:
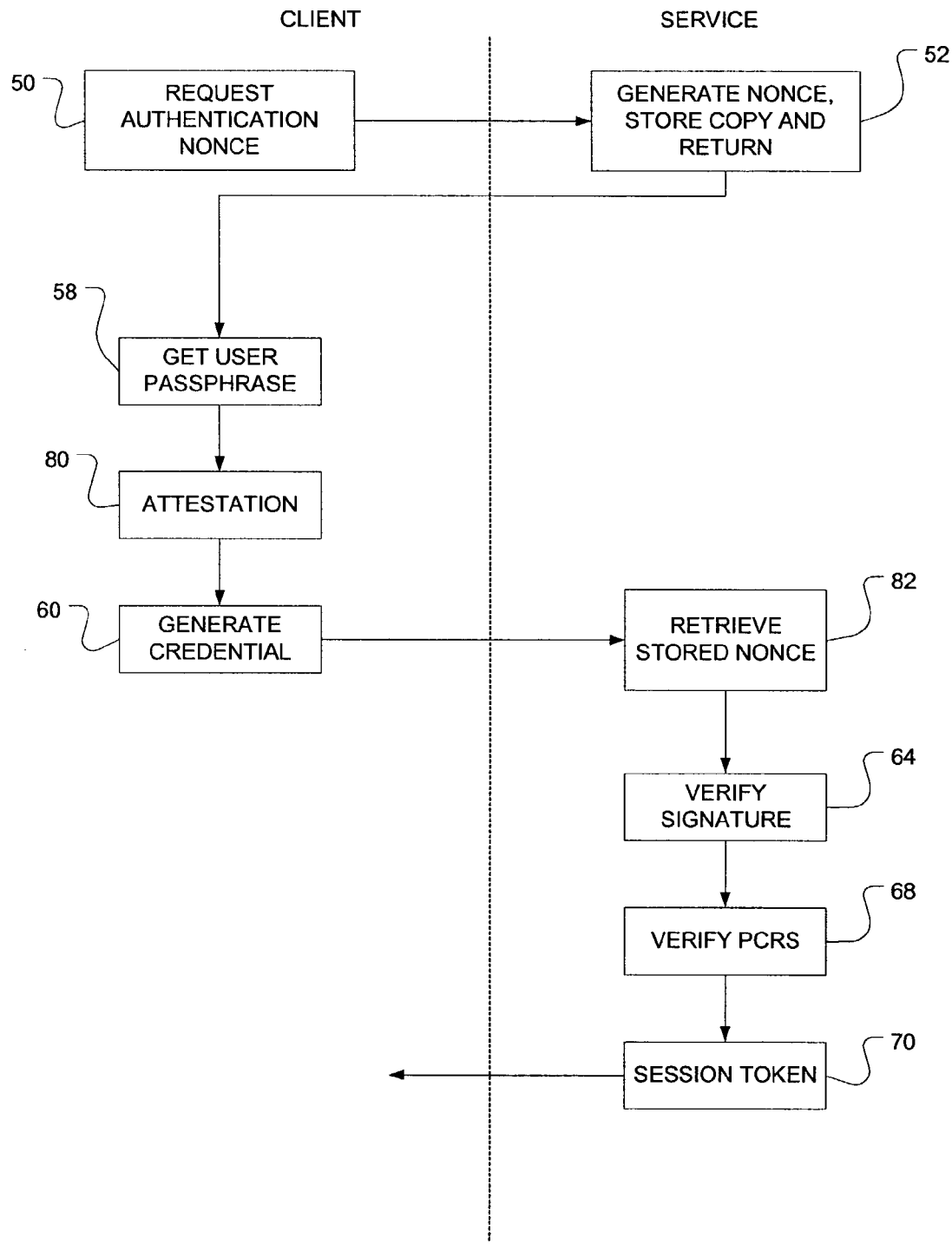
FIG. 7 shows a flowchart of an alternative embodiment of a method of accessing a service by a client that has previously registered with the service.

In another embodiment of an interaction process, FIG. 7 demonstrates an interaction based upon the second registration embodiment discussed above. In that registration process, the unique platform ID, the passphrase and user ID were independently proved to be validly associated. In this embodiment, the user requests the authentication nonce at 50, and the service generates a nonce, stores a copy and returns it to the user at 52. When the service obtains the passphrase at 58, in this embodiment, it provides platform attestation at 80 based upon the attested passphrase proven during the registration process. The service then retrieves the nonce at 82 and proceeds with signature and PCR verification to provide the token at 70.

In the embodiments set forth above, which are intended only as examples, the service allows secure access to users based upon the platform from which the user seeks to gain access. The service receives a request for a nonce, generates the nonce, stores a copy and returns it to the user. The service then obtains a credential from the client, typically in the form of an attestation, verifies the signature and PCR values contained in or related to the credential and then passes a session token back to the user.

In this manner, unique platform identifiers may be used to secure the identity of the user. Interlopers can no longer access and falsify their identities without access to the physical platform used by the user during registration. While this may be inconvenient for many users who may roam from computer to computer for all interactions, it could be used by service providers such as financial institutions to require transactions of a certain type or level to be performed from the user's home computer.

Thus, although there has been described to this point a particular embodiment for a method and apparatus for providing secure service interactions, it is not intended that such specific references be considered as limitations upon the scope of this invention except in-so-far as set forth in the following claims.

What is claimed is:

1. A method of establishing secure communication between a platform and a service, the method comprising:
   performing a registration process with the service, the registration process including:
   generating platform configuration register (PCR) values for the platform;
   obtaining a passphrase;
   transmitting a new user identifier, the passphrase, a unique platform identifier, and the PCR values to the service, wherein the PCR values have a 1:1 relationship with the platform; and
   storing the passphrase, the PCR values, the unique platform identifier and the new user identifier at the service; and
   performing a login process with the service, the login process including:
   requesting an authentication nonce from the service;
   generating the authentication nonce at the service;
   storing a copy of the authentication nonce at the service;
   returning the authentication nonce to the platform;
   generating an attestation at the platform, the attestation comprising a digital signature and the PCR values;
   acquiring a login passphrase from a user;
   combining the login passphrase with the attestation;

verifying the login passphrase, the digital signature, and the PCR values; and providing a session token from the service to the platform.

2. The method of claim 1, wherein generating the PCR values comprises:

taking an initial 64 Kbit measurement;

hashing the initial 64 Kbit measurement to a first 160-bit value;

concatenating the first 160-bit value with a second 160-bit value to form a 320-bit value;

hashing the 320-bit value into a third 160-bit value; and storing the third 160-bit value in a PCR.

3. The method of claim 1, wherein transmitting the new user id, the passphrase, the unique platform identifier, and the PCR values to the service further comprises the service transmitting a request to the platform prior to the transmitting of the new user id, the passphrase, the unique platform identifier, and the PCR values to the service.

4. The method of claim 1 wherein the passphrase, the PCR values and the unique platform identifier are bound to the new user identifier to allow for easier and faster access for subsequent interactions.

5. The method of claim 1 wherein performing the registration process further comprises:

receiving the unique platform identifier and the passphrase at the service;

associating the unique platform identifier and the passphrase; and obtaining proof that an association of the unique platform identifier and the new user identifier is valid.

6. The method of claim 5, wherein obtaining proof comprises the use of a trusted environment.

7. The method of claim 1, wherein obtaining the passphrase comprises a user entering the passphrase using an input device.

8. A method of establishing secure communication between a platform and a service, the method comprising:

performing a registration process with the service, the registration process including:

generating platform configuration register (PCR) values for the platform;

transmitting a new user identifier, a passphrase, a unique platform identifier, and the PCR values to the service, wherein the unique platform identifier is part of a fixed token that is permanently affixed to the motherboard of the platform; and storing the passphrase, the PCR values, the unique platform identifier and the new user identifier at the service; and performing a login process with the service, the login process including:

requesting an authentication nonce from the service;

generating the authentication nonce at the service;

storing a copy of the authentication nonce at the service;

returning the authentication nonce to the platform;

combining the nonce and the passphrase into an attestation nonce, the attestation nonce comprising a digital signature and the PCR values;

acquiring a login passphrase from a user;

combining the login passphrase with the attestation nonce to form a credential;

transmitting the credential to the service; and verifying the digital signature and the PCR values.

9. The method of claim 8, further comprising providing a session token from the service to the platform when the digital signature and the PCR values are verified to be valid at the service.

10. A platform comprising:

a fixed token;

a communications port;

a user interface; and a processor, the processor configured to:

perform a registration process with a service, the registration process including:

generating platform configuration register (PCR) values associated with the fixed token for the platform;

obtaining a passphrase;

transmitting a new user identifier, the passphrase, a unique platform identifier, and the PCR values through the communications port to the service, wherein the PCR values have a 1:1 relationship with the platform; and storing the passphrase, the PCR values, the unique platform identifier and the new user identifier at the service; and perform a login process with the service, the login process including:

requesting an authentication nonce from the service;

generating the authentication nonce at the service;

storing a copy of the authentication nonce at the service;

returning the authentication nonce to the platform;

generating an attestation at the platform, the attestation comprising a digital signature and the PCR values;

acquiring a login passphrase from a user;

combining the login passphrase with the attestation;

verifying the login passphrase, the digital signature, and the PCR values; and providing a session token from the service to the platform.

11. The platform of claim 10, wherein obtaining the passphrase comprises a user entering the passphrase using the user interface.

12. The platform of claim 10, wherein the fixed token is an integrated circuit chip permanently affixed to the platform.

13. The platform of claim 10, wherein the communications port is an Ethernet port.

* * * * *